(12) United States Patent
Walsh et al.

(10) Patent No.: US 11,161,366 B2
(45) Date of Patent: Nov. 2, 2021

(54) SPEED SQUARE WITH EXTENSION

(71) Applicant: APEX BRANDS, INC., Apex, NC (US)

(72) Inventors: Brendan Michael Walsh, Holly Springs, NC (US); Timothy T. McKenzie, Westminster, MD (US)

(73) Assignee: APEX BRANDS, INC., Apex, NC (US)

( * ) Notice: Subject to any disclaimer, the term of this patent is extended or adjusted under 35 U.S.C. 154(b) by 247 days.

(21) Appl. No.: 16/345,868

(22) PCT Filed: Oct. 24, 2017

(86) PCT No.: PCT/US2017/058060
§ 371 (c)(1),
(2) Date: Apr. 29, 2019

(87) PCT Pub. No.: WO2018/081099
PCT Pub. Date: May 3, 2018

(65) Prior Publication Data
US 2020/0047542 A1 Feb. 13, 2020

Related U.S. Application Data

(60) Provisional application No. 62/496,889, filed on Oct. 31, 2016.

(51) Int. Cl.
B43L 7/02 (2006.01)
G01B 3/56 (2006.01)
B43L 7/027 (2006.01)

(52) U.S. Cl.
CPC ............... B43L 7/0275 (2013.01); B43L 7/02 (2013.01); G01B 3/566 (2013.01)

(58) Field of Classification Search
CPC .......... B43L 7/0275; B43L 7/02; G01B 3/566
(Continued)

(56) References Cited

U.S. PATENT DOCUMENTS 1,320,689 A * 11/1919 Hart .................. G01B 3/56
33/459
3,908,281 A * 9/1975 Fox .................. G01C 5/00
33/228

(Continued)

FOREIGN PATENT DOCUMENTS

CN 202879035 U 4/2013
CN 205156921 U 4/2016
(Continued)

OTHER PUBLICATIONS

Office Action from related CN application No. 201780081746.1 dated Sep. 2, 2020, all pages cited in its entirety.
(Continued)

Primary Examiner — Yaritza Guadalupe-McCall
(74) Attorney, Agent, or Firm — Burr & Forman, LLP

(57) ABSTRACT

A speed square is provided including a triangular flat plate having measurement markings indicated on a least one face, a T bar affixed to, and extending along, the length of the first side of the triangular flat plate, and an extension element operably coupled to an end of second side of the triangular flat plate opposite the T bar. The extension element having measurement markings indicated on at least one face, such that the measurement markings of the triangular flat face continue on the extension element.

17 Claims, 6 Drawing Sheets

(58) Field of Classification Search
USPC .......................................................... 33/403
See application file for complete search history.

(56) References Cited

U.S. PATENT DOCUMENTS

| | | | | |
|---|---|---|---|---|
| 5,832,618 | A * | 11/1998 | Scarborough | G01C 9/28 33/451 |
| 6,101,730 | A * | 8/2000 | Marino | B28D 1/225 33/456 |
| 7,114,264 | B1 * | 10/2006 | Hurley | B25H 7/00 33/423 |
| 7,174,650 | B1 | 2/2007 | Marshall | |
| 7,481,143 | B2 * | 1/2009 | Hiland, Jr. | B23D 59/001 33/418 |
| 8,074,368 | B2 * | 12/2011 | Atwood | G01B 3/04 33/418 |
| 8,146,260 | B1 * | 4/2012 | Visser | B43L 13/028 33/415 |
| D850,301 | S * | 6/2019 | Elysium | D10/65 |
| 2004/0172846 | A1 * | 9/2004 | McRae | G01B 3/1041 33/760 |
| 2006/0085993 | A1 * | 4/2006 | Frankowiak | B43L 7/12 33/465 |
| 2009/0139104 | A1 * | 6/2009 | Rohweder | B25H 7/00 33/478 |
| 2010/0000107 | A1 * | 1/2010 | Cobb | G01C 9/26 33/374 |
| 2010/0077625 | A1 * | 4/2010 | O'Morrow, Sr. | B43L 7/005 33/476 |
| 2010/0139106 | A1 * | 6/2010 | Atwood | G01B 3/04 33/418 |
| 2012/0047758 | A1 * | 3/2012 | Sander, Jr. | G01B 3/1003 33/770 |
| 2016/0097624 | A1 | 4/2016 | Phillips | |
| 2020/0047542 | A1 * | 2/2020 | Walsh | G01B 3/566 |
| 2020/0307300 | A1 * | 10/2020 | Logan | B43L 7/12 |

FOREIGN PATENT DOCUMENTS

| | | |
|---|---|---|
| DE | 202008016391 U1 | 3/2009 |
| WO | 2008024121 A2 | 2/2008 |

OTHER PUBLICATIONS

International Search Report and Written Opinion of PCT/US2017/058060 dated Jan. 15, 2018, all enclosed pages cited.

* cited by examiner

SPEED SQUARE WITH EXTENSION

CROSS REFERENCE TO RELATED APPLICATIONS

This application claims priority to U.S. application No. 62/496,889 filed Oct. 31, 2016, the entire contents of which are hereby incorporated by reference.

TECHNICAL FIELD

Example embodiments generally relate to hand tools and, in particular, relate to a speed square with an extension.

BACKGROUND

Typical speed squares are used throughout construction industries. Speed squares usually include a metal plate in the shape of a right triangle with a T bar on one side of the plate. The plate is embossed or otherwise marked with one or more measurement markings, such as length, angles, and the like, such that a craftsman may set the square T bar at a position on a working material and use the measurement markings to quickly measure and mark angles, lines, or the like. The measurements and angle markings may be used for cutting the material in the desired shape and size.

Speed squares are manufactured in a variety of materials and sizes to accommodate the breadth of environments and uses in which speed squares are utilized. However, craftsman may have to switch between multiple speed squares, such as when working on different sized working materials, which may slow production or be tedious for the craftsman.

BRIEF SUMMARY OF SOME EXAMPLES

According to some example embodiments, a speed square is provided including a triangular flat plate having measurement markings indicated on at least one face, a T bar affixed to and extending along the length of a first side of the triangular flat plate, and an extension element operably coupled to an end of a second side of the triangular flat plate opposite the T bar. The extension element including measurement markings indicated on at least one face, such that the measurement markings of the triangular flat face continue on the extension element.

According to another example embodiment, a speed square may be provided to include a triangular shaped, flat plate, a T bar and an extension. The flat plate may include a first side having a first end and a second end, a second side having a first end and a second end, and a third side that forms a hypotenuse extending between the second end of the first side and the second end of the second side. The flat plate may include a first set of measurement markings indicated on both opposing faces of the flat plate at the first side. The T bar may be affixed to and extend substantially along a length of the second side. The extension element may be operably coupled to the flat plate to extend away from the second end of the first side. The extension element may have a second set of measurement markings indicated a first face, and a third set of measurement markings on a second face that is opposite the first face. The second set of measurement markings may be a continuation of the first set of measurement markings, and the third set of measurement markings may be substantially identical to the first set of measurement markings.

BRIEF DESCRIPTION OF THE SEVERAL VIEWS OF THE DRAWING(S)

Having thus described the tool in general terms, reference will now be made to the accompanying drawings, which are not necessarily drawn to scale, and wherein:

Figure 5A:
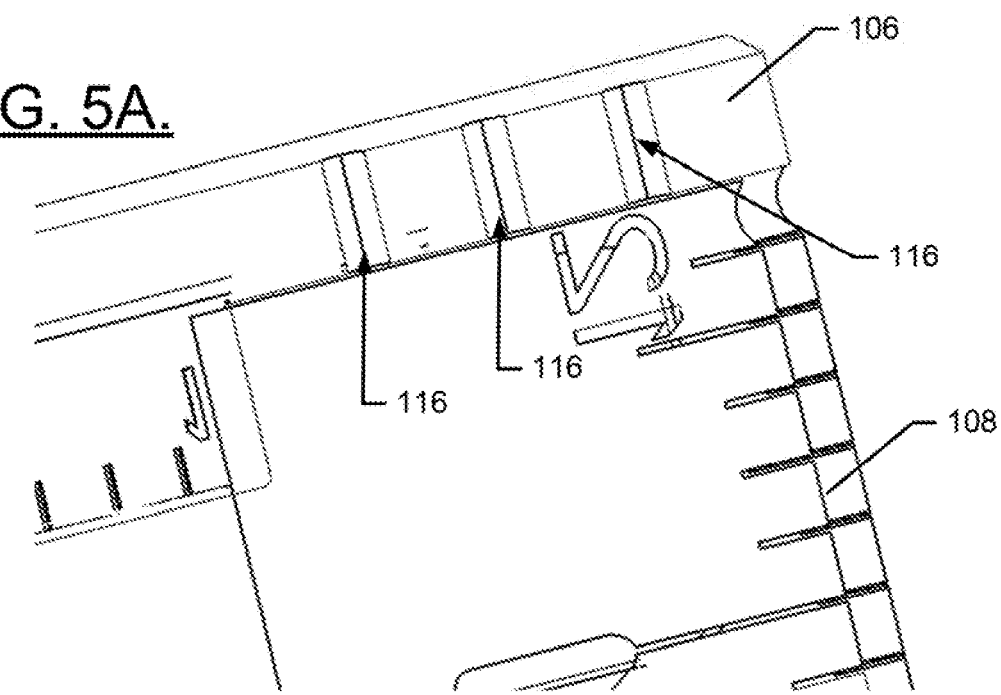
Figure 5B:
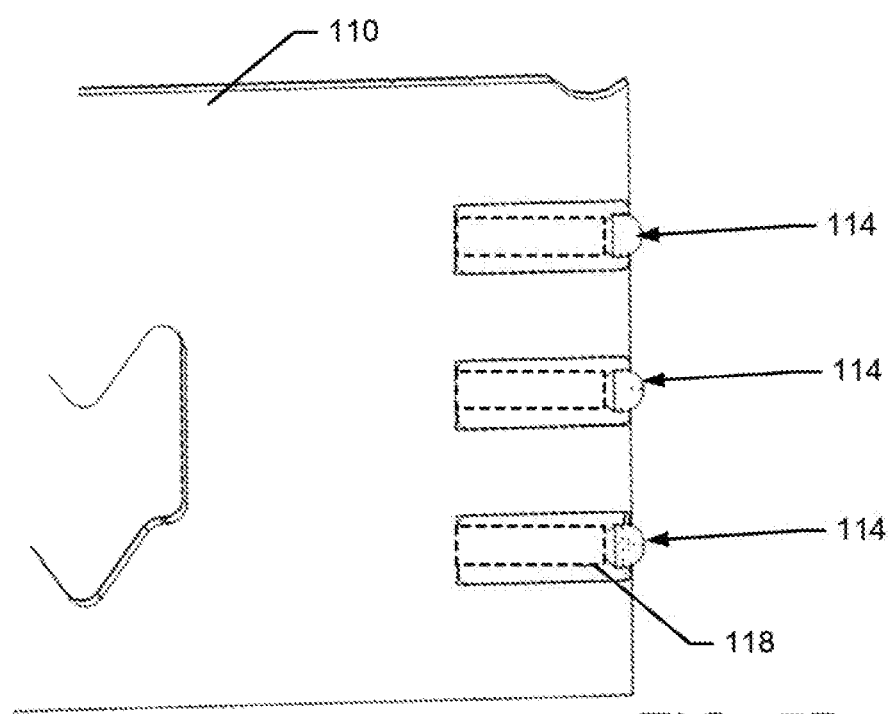
Figure 5C:
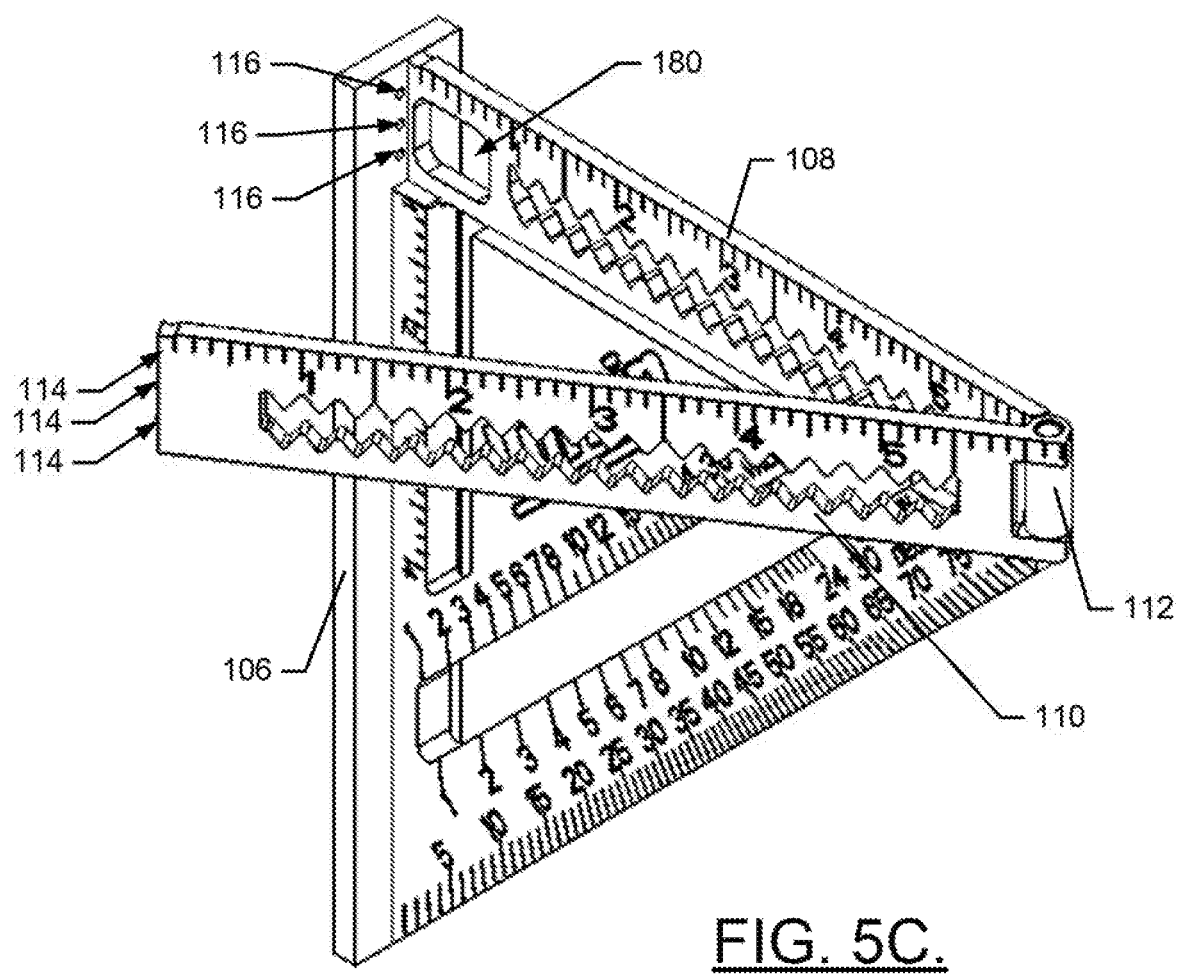

FIG. 5, which is defined by FIGS. 5A, 5B and 5C, illustrates a retention element according to an example embodiment.

Figure 6:
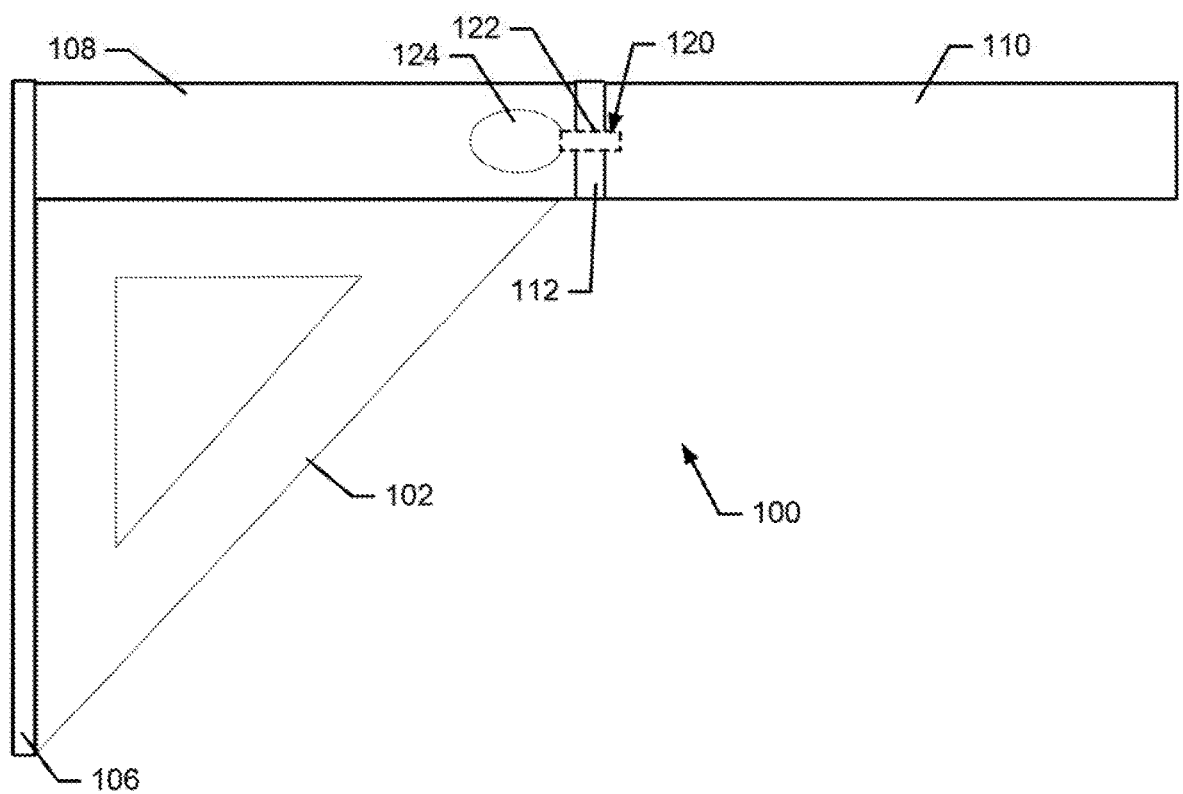

FIG. 6 illustrates an extension lock according to an example embodiment.

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. As used herein, operable coupling should be understood to relate to direct or indirect connection that, in either case, enables functional interconnection of components that are operably coupled to each other.

A speed square is provided with a retractable extension element. The extension element may continue the measurement markings of the flat plate, such that, when extended, the extension element provides a continuous straight edge extending from the flat plate with an extension of the measurement markings. The speed square extension may be particularly useful in instances in which a craftsman is transitioning between smaller material and longer or thicker working material. The extension element may be retracted when working with the smaller working material and extended when working with the larger working material, such that measurements and markings may be made without switching speed squares, for example from a 7 inch speed square to a 12 inch speed square. Additionally, the extension element may be retracted for storage or when accessing a job site through a small access point.

Example Speed Square

Figure 1:
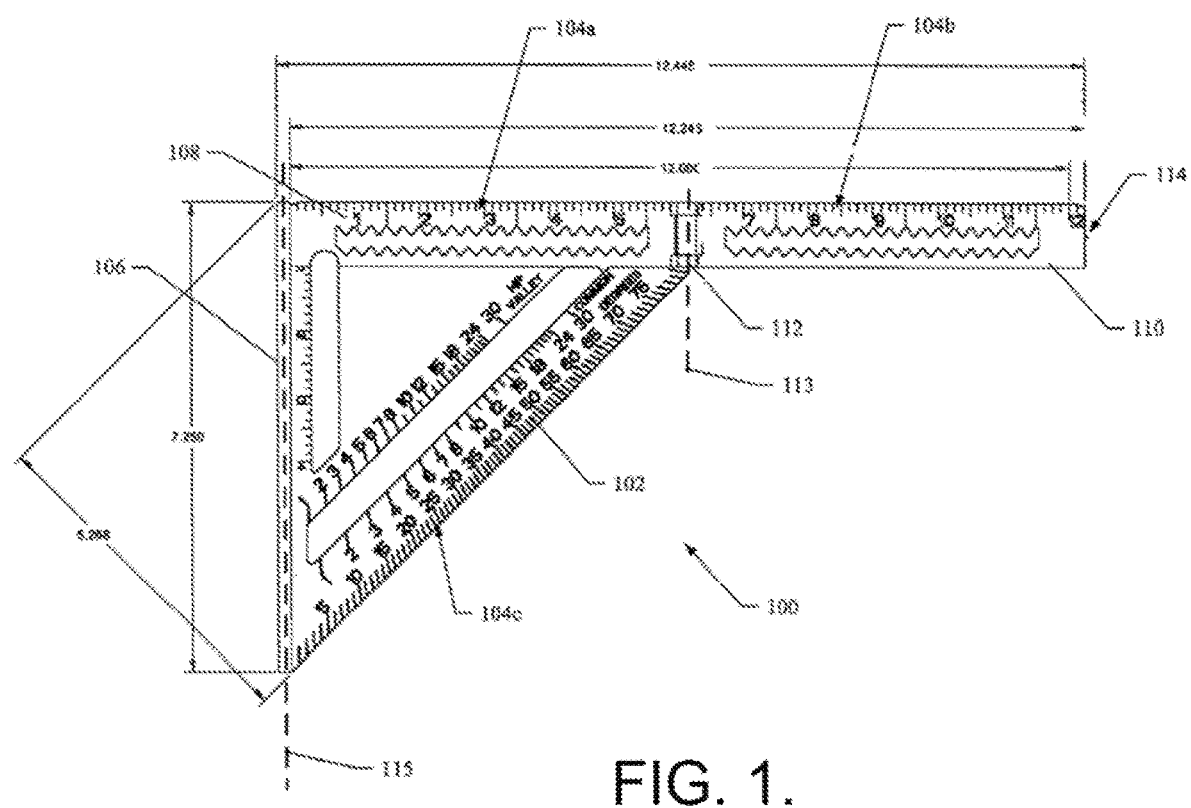
FIG. 1 illustrates a speed square with an extension element extended according to an example embodiment.

An example embodiment of the speed square will now be described in reference to FIG. 1. FIG. 1 illustrates a speed square 100 with an extension element 110 extended according to an example embodiment. The speed square 100 may include a generally flat plate 102. The flat plate 102 may be formed in the shape of a right triangle. In some example embodiments, the flat plate 102 may be formed from aluminum, steel, plastic, or the like. In an example embodiment, the flat plate 102 may include measurement markings 104 disposed along outer surfaces of one or more outer edges of the right triangle that forms the flat plate 102. The measurement markings 104 may illustrate lengths in selected units (which may also be displayed on the flat plate 102) from a reference point, such as length relative to a corner of the flat plate 102, angle marks relative to a corner of the flat plate 102, or the like. The measurement markings 104 may be printed, embossed, inscribed, or otherwise indicated on the flat plate 102.

The speed square 100 may also include a T bar 106. The T bar 106 may be affixed to and extend along the length of a first side of the flat plate 102. The T bar 106 may extend past both faces of the flat plate 102 substantially perpendicularly to the faces, such that a portion of the T bar 106 may extend over the edge of a working material when a face of the flat plate 102 is placed on the working material. The T bar 106 may be placed flush to straight surfaces of a working material for marking and measuring of the working material using the measurement markings 104 of the flat plate 102.

The extension element 110 may be hingedly connected to an end of a second side 108 of the flat plate 102 opposite the T bar 106. In some example embodiments, the speed square 100 may include a hinge 112 connected on a first side to the flat plate 102 and on a second side to the extension element 110. Alternatively, the flat plate 102 and extension element 110 may include hinge elements, such as opposing C couplings and shafts, aperture and tabs or snap fittings, apertures with a hinge pin, or the like. In an example embodiment, the a rotational axis 113 of the hinge 112 may be substantially parallel to a direction of extension 115 of the T bar 106.

The measurement markings 104 may include a first set of measurement markings 104a disposed on an outer edge on the second side 108 of the flat plate 102. The first set of measurement markings 104a may have a length substantially equal to a length of the second side 108, such as a length of 0-6 inches. In an example embodiment, the measurement markings 104 may include a second set of measurement markings 104b on the extension element 110. The second set of measurement markings 104b may have a length substantially equal to a length of the extension element 10 (e.g., about 6 inches in this case), but the markings may increment from the first set of measurement markings 104a. Thus, for example, if the first set of measurement markings 104a extend from 0-6 inches, then the second set of measurement markings may extend from 6-12 inches. In some example embodiments, the measurement markings 104 may include a third set of measurement markings 104c, such as angle marks on the hypotenuse side of the flat plate 102.

The extension element 110 may be configured to extend and retract (e.g., by pivoting about the rotational axis 113) between a stowed position and an open position. In the stowed position, the extension element 110 may lie adjacent to or on the flat plate 102. The plane of the extension element 110 may be parallel (and adjacent) to the plane in which the flat plate 102 lies. In the open position the extension element 110 may extend out from the second side 108 of the flat plate 106 and lie in the same plane as the flat plate 102. In the open position, the second side 108 of the flat plate 102 may form a continuous straight edge with the extension element 110. Additionally, the measurement markings 104 may be continuous across the second side 108 of the flat plate 102 and the extension element 110.

The speed square 100 may include a retention element 114 configured to retain the extension element 110 in the stowed position. The retention element 114 is discussed in further detail below in reference to FIG. 4.

Figure 2:
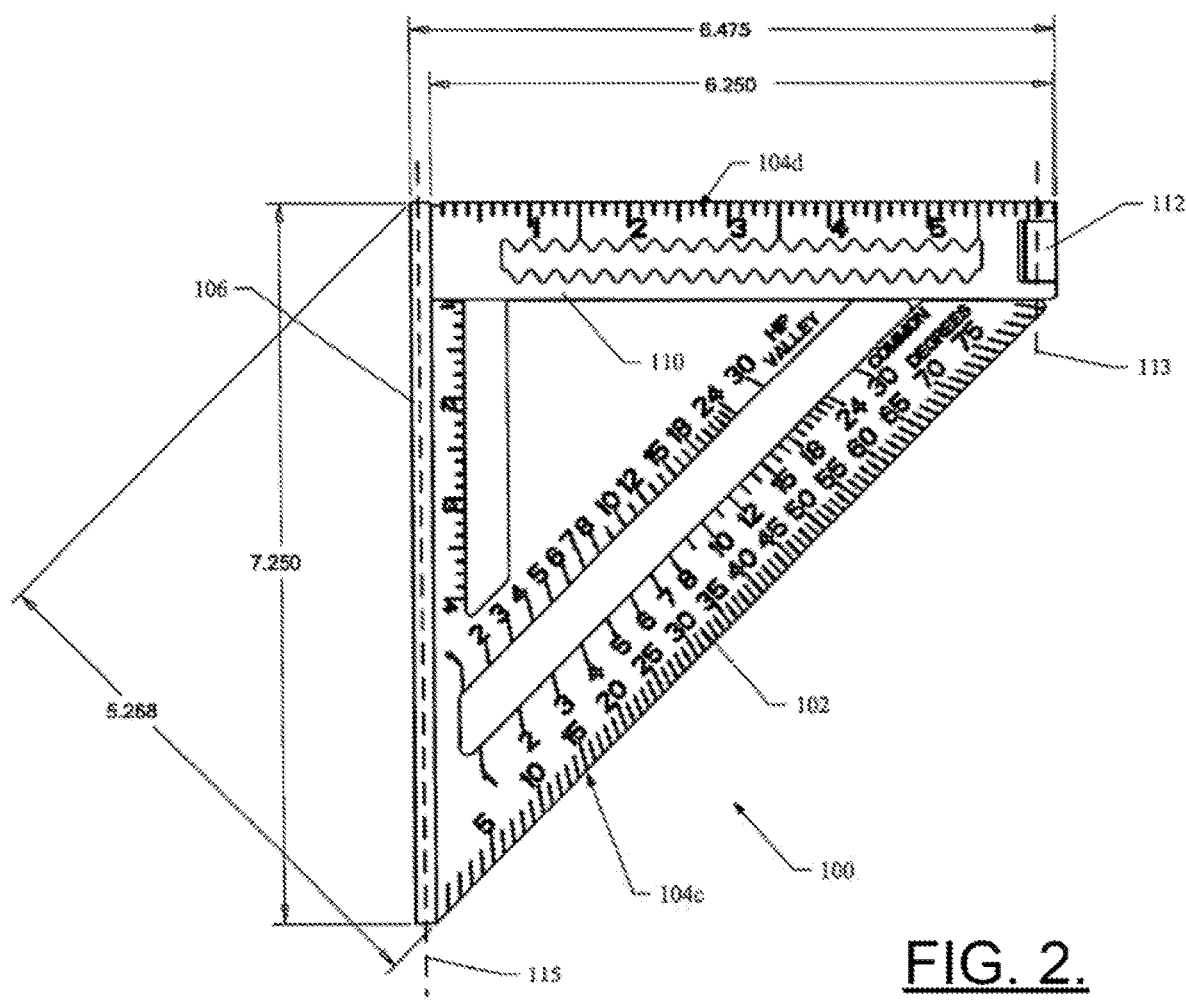
FIG. 2 illustrates a speed square with an extension element retracted according to an example embodiment.

FIG. 2 illustrates the speed square 100 with the extension element 110 retracted according to an example embodiment. In the stowed position, depicted in FIG. 2, the extension element 110 may lie on the flat plate 102. The measuring edges of the extension element 110 and the second side 108 of the flat plate 102 may be flush when the extension element 110 is in the stowed position. The extension element 110 may include a fourth set of measurement markings 104d. The fourth set of measurement markings 104d may be configured such that they reproduce the first set of measurement markings 104a on the flat plate 102, since the first set of measurement markings 104a are obscured when the extension element 110 is in the stowed position.

Figure 3:
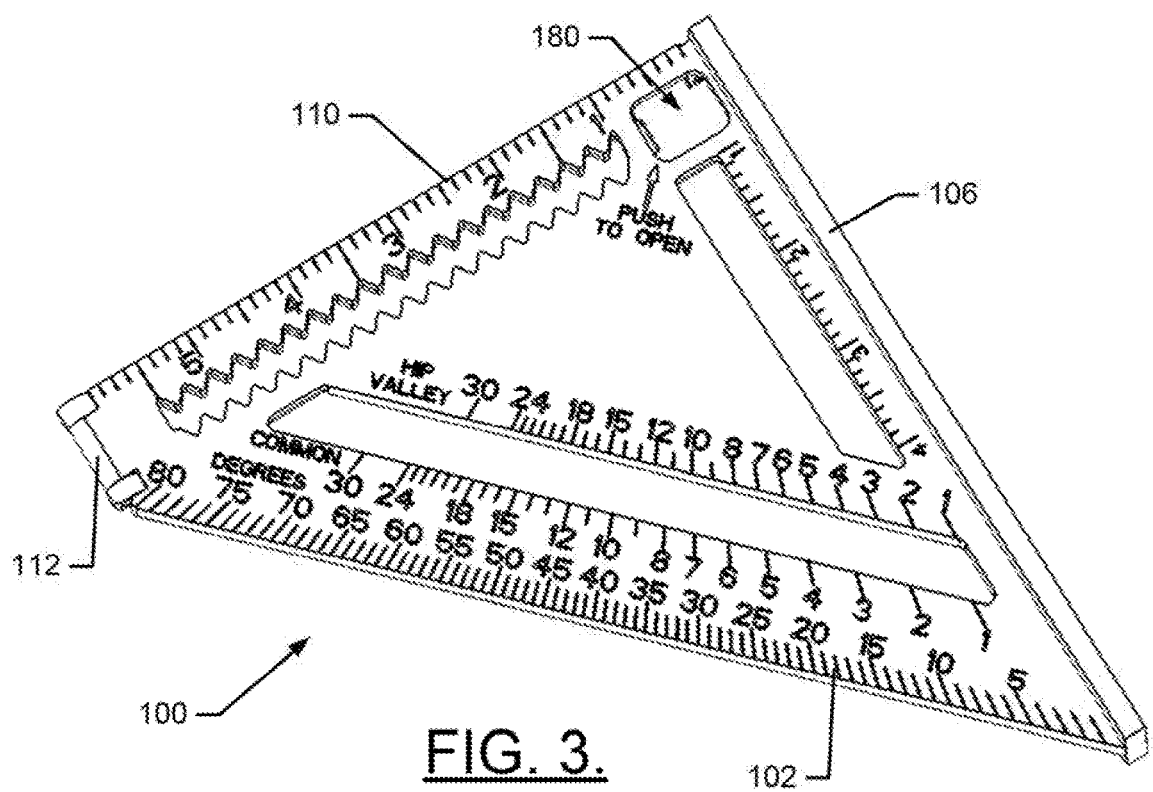
FIG. 3 illustrates a perspective view of a speed square with an extension element retracted according to an example embodiment.
Figure 4:
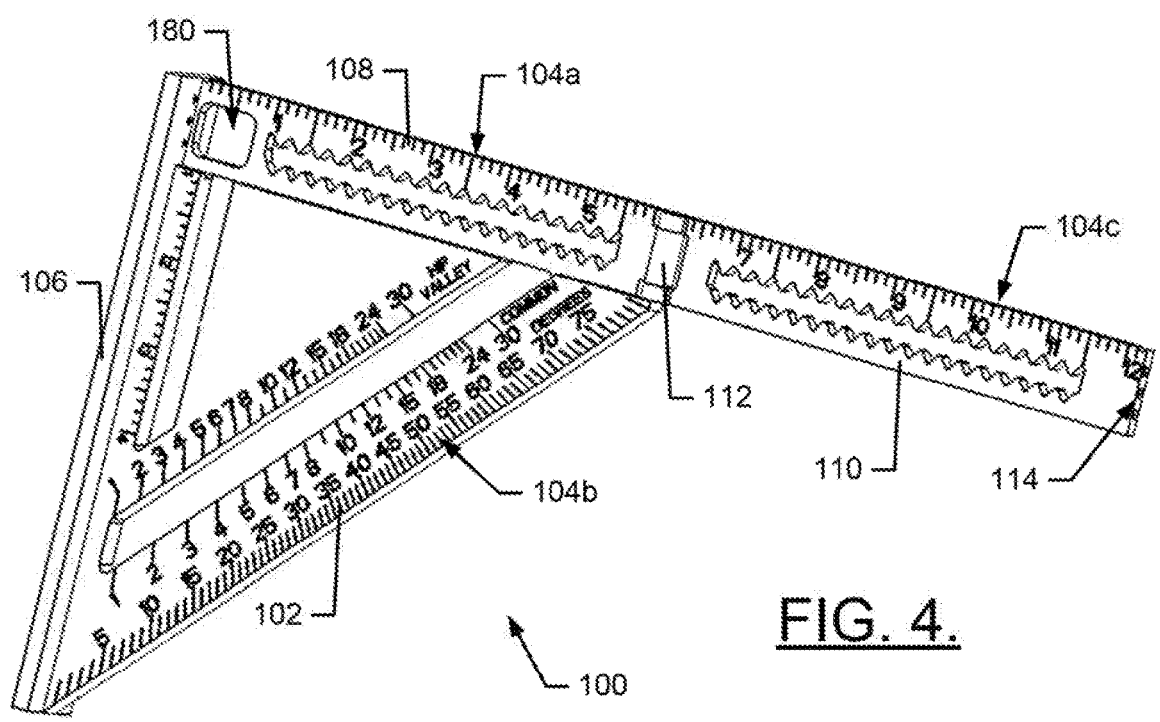
FIG. 4 illustrates a perspective view of a speed square with the extension element in the open position according to an example embodiment.

FIG. 3 illustrates a perspective view of the speed square 100 with the extension element 110 retracted according to an example embodiment. The view of the speed square 100 in FIG. 3 is of the opposite side to that shown in FIGS. 1 and 2. As can be seen in FIG. 3, many of the markings discussed above may be duplicated on the opposing sides of the speed square 100. However, it can also be seen from the view of FIG. 3 that an access window 180 may be provided proximate to an intersection of the T bar 106 and the second side 108 of the flat plate 102. From this side of the speed square 100, the extension element 110 may be visible through the access window 180. Furthermore, the user of the speed square 100 may be enabled to push the extension element 110 through the access window 180 in order to unlatch the retention element 114 and allow the extension element 110 to be moved from the stowed position (shown in FIG. 3) to the open position of FIG. 4. FIG. 4 illustrates a perspective view of the speed square 100 with the extension element in the open position according to an example embodiment. FIG. 4 also illustrates the access window 180 while the speed square 100 is in the open position.

FIG. 5 illustrates the retention element 114 according to an example embodiment. In this regard, FIG. 5A illustrates a cross section view taken through a portion of the T bar 106 parallel to the plane of the flat plate 102. FIG. 5B illustrates a cross section view taken through the extension element 110. The extension element 110 depicted in FIG. 5C is in an intermediate position, e.g. partially open, near the stowed position. As can be appreciated from FIGS. 5A, 5B and 5C, the speed square 100 may include one or more instances of the retention element 114. In the examples of FIG. 5, three retention elements 114 and corresponding apertures 116 for interacting therewith are shown. The retention element 114 may be configured to selectively interact with an aperture 116 or depression disposed in a corresponding surface of the T bar 106 or the extension element 110. The retention element 114 may include a plunger 118 or biasing element (e.g., spring) configured to push a protruding element (e.g., a ball) that may be part of or operably coupled to the plunger 118 outwardly relative to an end of the extension element 110. When the retention element 114 is aligned with the aperture 116, the plunger 118 may force the protruding element into the aperture 116 to affix the extension element 110 in the stowed position. The protruding element (e.g., ball) may be pushed inwardly against biasing of the plunger 118 to enable the protruding element to pass over the corresponding part of the T bar 106 to align the retention element 114 with the aperture 116 and then extend into the aperture 116 when alignment is achieved. Likewise, when the user pushes the extension element 110 through the access window 180, the force may overcome the plunger 118 such that the protruding element 119 is withdrawn from the aperture 116 to permit transition of the extension element 110 to the open position. Thus, for example, the plunger 118 may be configured to be biased toward the aperture 116 or depression to maintain the extension element 110 in a stowed position, such as by a spring or other biasing element. A portion of the plunger 118 (e.g., the protruding element 119) may extend into the aperture 116 when the extension element 110 is in the stowed position limiting or preventing the extension element 110 from extending. In some example embodiments, the speed square 100 may include a release, such as the lock release, discussed below in reference to FIG. 6. The release may be configured to actuate the plunger 118 to withdraw from the aperture 116 or depression. Alternatively, the release may be configured to eject the plunger 118 from the aperture 116, such as by pushing portion of the plunger 118 out of the aperture 116.

Of note, although the plunger 118 is disposed in the extension element 110 in the example of FIG. 5, and the aperture 116 is disposed in the T bar 106, these locations could be reversed in alternative examples. In either case, the plunger 118 may operate linearly in a direction substantially parallel to the direction of longitudinal extension of the extension element 110, and the aperture 116 may be correspondingly disposed to receive such movement (again, parallel to the direction of longitudinal extension of the extension element 110).

FIG. 6 illustrates an extension lock according to an example embodiment. The extension lock may be configured to retain the extension element 110 in the open position. The extension lock may include an aperture 120 or depression in the flat plate 102, the extension element 110, or the hinge 120. The extension lock may also include a plunger 122 in another of the flat plat 102, extension element 110, or hinge 112. The plunger 122 may be configured to be biased toward the aperture 120 or depression to maintain the extension element 110 in an open position, such as by a spring or other biasing element. A portion of the plunger 122 may extend into the aperture 120 or depression when the extension element 110 is in the open position limiting or preventing the extension element 110 from retracting. In some example embodiments, the speed square 100 may include a release 124. The release 124 may be configured to actuate the plunger 122 to withdraw from the aperture 120 or depression. Alternatively, the release 124 may be configured to eject the plunger 122 from the aperture 120 or depression, such as by pushing portion of the plunger 118 out of the aperture 116 or depression. In an example embodiment, the release 124 may be a thumb slide or button.

In some embodiments, the speed square may be further configured for optional modifications. In this regard, for example, the speed square may also include a retention element configured to retain the extension element in a stowed position. In an example embodiment, the retention element includes an aperture in the extension element or the T bar and a plunger on the other of the extension element and the T bar. The plunger is biased toward the aperture in the stowed position. In some example embodiments, the speed square also includes a hinge configured to extend and retract the extension element between an open position and a stowed position. In an example embodiment, a rotational axis of the hinge is parallel with a direction of extension of the T bar. In an example embodiment, the speed square also includes an extension lock configured to retain the extension element in an open position. In some example embodiments, the extension lock includes an aperture in the extension element or triangular flat plate and a plunger in the other of the extension element and the triangular flat plate. The plunger is biased toward the aperture in the open position. In an example embodiment, the extension lock comprises a lock release configured to release the extension lock to enable retraction of the extension element to a stowed position.

Many modifications and other embodiments of the tool set forth herein will come to mind to one skilled in the art to which these inventions pertain having the benefit of the teachings presented in the foregoing descriptions and the associated drawings. Therefore, it is to be understood that the power tools are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A speed square comprising:
   a triangular flat plate having measurement markings indicated on at least one face;
   a T bar affixed to, and extending along, a length of a first side of the triangular flat plate;
   an extension element operably coupled to an end of a second side of the triangular flat plate opposite the T bar, the extension element having measurement markings indicated on at least one face, such that the measurement markings of the triangular flat face continue on the extension element; and
   a retention element configured to retain the extension element in a stowed position,
   wherein the retention element comprises a plunger configured to extend toward an aperture to retain the extension element in the stowed position responsive to alignment of the plunger and the aperture, wherein the plunger is biased toward the aperture in the stowed position.

2. The speed square of claim 1, wherein the plunger is disposed in the extension element and the aperture is disposed in the T bar.

3. The speed square of claim 2, wherein the plunger is configured to urge a protruding element into the aperture, and wherein the plunger is oriented to urge the protruding element in a direction substantially parallel to a direction of longitudinal extension of the extension element.

4. The speed square of claim 1, wherein multiple instances of the retention element are provided on complementary surfaces of the T bar and the extension element.

5. The speed square of claim 1, wherein an access window is disposed in the triangular flat plate proximate an intersection of the T bar and the second side, and wherein the extension element is visible through the access window in the stowed position and not visible through the access window in an open position.

6. The speed square of claim 5, wherein the extension element is configured to transition out of the stowed position responsive to force exerted on the extension element through the access window to overcome biasing of the plunger and release the retention element.

7. The speed square of claim 1 further comprising:
a hinge configured to extend and retract the extension element between an open position and a stowed position.

8. The speed square of claim 7, wherein a rotational axis of the hinge is parallel with a direction of extension of the T bar.

9. The speed square of claim 1, wherein the T bar extends substantially perpendicular to a plane in which the triangular flat plate lies away from both opposing faces of the triangular flat plate.

10. The speed square of claim 1, wherein the extension element is hingedly connected to the triangular flat plate proximate to an intersection of the second side and a third side forming a hypotenuse of the triangular flat plate.

11. The speed square of claim 10, wherein the third side further comprises a set of angle measurement markings to enable measurement of an angle relative to the T bar.

12. A speed square comprising:
a triangular flat plate having measurement markings indicated on at least one face;
a T bar affixed to, and extending along, a length of a first side of the triangular flat plate;
an extension element operably coupled to an end of a second side of the triangular flat plate opposite the T bar, the extension element having measurement markings indicated on at least one face, such that the measurement markings of the triangular flat face continue on the extension element; and
an extension lock configured to retain the extension element in an open position,
wherein the extension lock comprises an aperture in the extension element or triangular flat plate and a plunger in the other of the extension element and the triangular flat plate, wherein the plunger is biased toward the aperture in the extended position.

13. The speed square of claim 12, wherein the extension lock comprises a lock release configured to release the extension lock to enable retraction of the extension element to a stowed position.

14. A speed square comprising:
a triangular flat plate having measurement markings indicated on at least one face;
a T bar affixed to, and extending along, a length of a first side of the triangular flat plate; and
an extension element operably coupled to an end of a second side of the triangular flat plate opposite the T bar, the extension element having measurement markings indicated on at least one face, such that the measurement markings of the triangular flat face continue on the extension element,
wherein the extension element has a second set of measurement markings on at least one surface of the extension element.

15. A speed square comprising:
a triangular shaped, flat plate comprising a first side having a first end and a second end, a second side having a first end and a second end, and a third side that forms a hypotenuse extending between the second end of the first side and the second end of the second side, the flat plate including a first set of measurement markings indicated on both opposing faces of the flat plate at the first side;
a T bar affixed to and extending substantially along a length of the second side; and
an extension element operably coupled to the flat plate to extend away from the second end of the first side, the extension element having a second set of measurement markings indicated a first face, and a third set of measurement markings on a second face that is opposite the first face,
wherein the second set of measurement markings is a continuation of the first set of measurement markings, and the third set of measurement markings is substantially identical to the first set of measurement markings.

16. The speed square of claim 15, wherein the extension element is hingedly connected to the second end of the first side to enable the extension element to shift between:
a stowed position where the third set of measurement markings covers the first set of measurement markings on one of the opposing faces of the flat plate, and
an open position where the extension element and the flat plate lie in a same plane.

17. The speed square of claim 16, wherein an access window is disposed in the flat plate proximate an intersection of the first end of the first side and the first end of the second side, and wherein the extension element is visible through the access window in the stowed position and not visible through the access window in the open position.

* * * * *